(12) United States Patent
Maeda et al.

(10) Patent No.: US 11,763,680 B2
(45) Date of Patent: Sep. 19, 2023

(54) STRADDLED VEHICLE

(71) Applicant: YAMAHA HATSUDOKI KABUSHIKI KAISHA, Iwata (JP)

(72) Inventors: Tomohito Maeda, Shizuoka (JP); Yuta Imafuku, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/697,773

(22) Filed: Mar. 17, 2022

(65) Prior Publication Data

US 2022/0301436 A1  Sep. 22, 2022

(30) Foreign Application Priority Data

Mar. 18, 2021  (JP) ................. 2021-044896

(51) Int. Cl.

| | |
|---|---|
| *G08G 1/16* | (2006.01) |
| *B62J 45/412* | (2020.01) |
| *B62J 45/42* | (2020.01) |
| *B62J 6/04* | (2020.01) |
| *G01S 13/931* | (2020.01) |
| *B62K 11/04* | (2006.01) |

(52) U.S. Cl.
CPC ............... *G08G 1/166* (2013.01); *B62J 6/04* (2013.01); *B62J 45/412* (2020.02); *B62J 45/42* (2020.02); *G08G 1/163* (2013.01); *G08G 1/165* (2013.01); *B62K 11/04* (2013.01); *G01S 2013/93271* (2020.01); *G01S 2013/93272* (2020.01)

(58) Field of Classification Search
CPC ........ G08G 1/166; G08G 1/163; G08G 1/165; B62J 45/412; B62J 45/42; B62J 6/04; G01S 2013/93271; G01S 2013/93272; B62K 11/04
See application file for complete search history.

(56) References Cited

U.S. PATENT DOCUMENTS

| | | | |
|---|---|---|---|
| 2017/0176591 A1 | 6/2017 | Pineda-Deom | |
| 2020/0369340 A1* | 11/2020 | Kuroba | B62J 50/22 |
| 2020/0398924 A1* | 12/2020 | Kuroba | B62J 45/42 |
| 2021/0061389 A1 | 3/2021 | Kawamura et al. | |
| 2021/0061395 A1 | 3/2021 | Koga et al. | |
| 2021/0188385 A1* | 6/2021 | Saeki | B62J 50/00 |

FOREIGN PATENT DOCUMENTS

| | | |
|---|---|---|
| EP | 2965976 A1 | 1/2016 |
| EP | 3453600 A1 | 3/2019 |
| JP | 2019048554 A | 3/2019 |

\* cited by examiner

*Primary Examiner* — Sisay Yacob
(74) *Attorney, Agent, or Firm* — Rabin & Berdo, P.C.

(57) ABSTRACT

A straddled vehicle including a vehicle body frame having a head pipe extending downward and forward, a steering shaft supported by the head pipe to be rotatable left and right, a front fork connected to the steering shaft, a front fender supported by the front fork, a front cover of which a portion is arranged further forward than the head pipe, and a radar supported by the vehicle body frame and arranged further forward than the head pipe. The front cover includes a front end, and a lower edge extending leftward or rightward from the front end in a front view, at least a portion of the lower edge being located at or below the front end. At least a portion of the radar is arranged further downward than the front end of the front cover, further downward than the lower edge, and further upward than the front fender.

14 Claims, 9 Drawing Sheets

STRADDLED VEHICLE

CROSS REFERENCE TO RELATED APPLICATIONS

This application claims the benefit of priority to Japanese Patent Application No. 2021-044896 filed on Mar. 18, 2021. The entire contents of this application are incorporated herein by reference.

BACKGROUND OF THE INVENTION

Field of the Invention

The present invention relates to a straddled vehicle having a radar for detecting objects such as other vehicles forward of the straddled vehicle.

Description of the Related Art

Straddled vehicles having a radar for detecting objects such as other vehicles forward have been known in the art, as disclosed in JP 2019-48554A, for example. With the straddled vehicle disclosed in JP 2019-48554A, the radar is arranged inside the front cover. A left headlight and a right headlight are attached to the front cover. The radar is arranged upward of the left headlight and the right headlight.

SUMMARY OF THE INVENTION

Technical Problem

A radar transmits electromagnetic waves forward. The radar receives electromagnetic waves (hereinafter, reflected waves) coming from the front that have been reflected off an object. In order for the radar to desirably transmit and receive electromagnetic waves, there should be no member, arranged forward of the radar, that blocks electromagnetic waves. The radar is preferably arranged as far forward as possible. With a straddled vehicle, a head pipe made of a metal is arranged rearward of the front cover. In order to prevent the head pipe from interfering with electromagnetic waves, the radar is preferably arranged as far forward as possible.

The radar is supported on the vehicle body frame with a support bracket, or the like, therebetween. Since the vehicle body frame is arranged rearward relative to the radar, the radar is cantilevered from the rear side. The more forward the radar is arranged, the longer the distance in the front-rear direction between the radar and the vehicle body frame. Now, the radar is a relatively heavy component. The longer the distance in the front-rear direction between the radar and the vehicle body frame, the more likely the radar will vibrate when the straddled vehicle is running. That is, the more forward the radar is arranged, the more likely the radar will vibrate. If the radar vibrates, the detection performance of the radar will lower.

It is an object of the present invention to provide a straddled vehicle capable of desirably detecting objects such as other vehicles forward by a radar.

Solution to Problem

A straddled vehicle disclosed herein includes: a vehicle body frame including a head pipe extending downward and forward; a steering shaft supported on the head pipe and being rotatable left and right; a front fork connected to the steering shaft; a front fender supported on the front fork; a front cover at least a portion of which is arranged forward relative to the head pipe; and a radar supported on the vehicle body frame and arranged forward relative to the head pipe. The front cover includes a front end, and a lower edge that extends leftward or rightward as the vehicle is viewed from the front and at least a portion of which is located at or below the front end. At least a portion of the radar is arranged downward relative to the front end of the front cover, downward relative to the lower edge and upward relative to the front fender.

With the straddled vehicle described above, the head pipe extends downward and forward. Therefore, the more downward the radar is arranged, the shorter the distance between the radar and the vehicle body frame in the front-rear direction. With the straddled vehicle described above, at least a portion of the radar is arranged downward relative to the front end of the front cover and downward relative to the lower edge. Thus, the radar is arranged relatively downward. Therefore, even if the radar is arranged relatively forward, the distance between the radar and the vehicle body frame in the front-rear direction does not become long, and the radar is less likely to vibrate. Therefore, it is possible with the radar to desirably detect objects such as other vehicles forward.

According to a preferred embodiment, the front cover includes a plurality of projecting portions that are projecting forward as the vehicle is viewed from the side. The front end of the front cover is provided on a projecting portion that is located lowermost among the plurality of projecting portions.

According to the embodiment described above, the radar is arranged more downward. Thus, even if the radar is arranged more forward, the distance between the radar and the vehicle body frame in the front-rear direction does not become long. Since the radar is less likely to vibrate, it is possible with the radar to desirably detect objects such as other vehicles forward.

The front cover may include: a front cowl arranged upward relative to a lower end of the head pipe; a left side cowl that is formed separately from the front cowl and at least a portion of which is arranged downward of the front cowl and leftward of a vehicle center line; and a right side cowl that is formed separately from the front cowl and at least a portion of which is arranged downward of the front cowl and rightward of the vehicle center line. The front end and the lower edge of the front cover may be provided on the left side cowl or the right side cowl.

According to a preferred embodiment, the radar is arranged downward relative to the front cowl.

According to the embodiment described above, the radar is arranged relatively downward. Therefore, even if the radar is arranged relatively forward, the distance between the radar and the vehicle body frame in the front-rear direction does not become long, and the radar is less likely to vibrate. Therefore, it is possible with the radar to desirably detect objects such as other vehicles forward.

According to a preferred embodiment, the radar is arranged rightward relative to the left side cowl and leftward relative to the right side cowl.

According to the embodiment described above, the radar is arranged near the center of the straddled vehicle. Therefore, it is possible to desirably detect objects such as other vehicles forward.

According to a preferred embodiment, the straddled vehicle includes a radar cover that is arranged forward of the radar and overlaps with the radar as the vehicle is viewed from the front.

According to the embodiment described above, it is possible with the radar cover to prevent mud, gravel, etc., from hitting the radar.

According to a preferred embodiment, the radar is arranged forward relative to an intersection between a front edge of the front fork and an upper edge of the front fender as the vehicle is viewed from the side.

According to the embodiment described above, the radar is arranged relatively forward. Therefore, it is possible to desirably detect objects such as other vehicles forward.

The intersection does not need to overlap with the front cover as the vehicle is viewed from the side.

According to a preferred embodiment, a distance between a rear end of the radar and a front end of the vehicle body frame in a front-rear direction is shorter than a distance between a lower end of the radar and an upper end of the front fender in an up-down direction.

According to the embodiment described above, since the distance between the radar and the vehicle body frame in the front-rear direction is short, the radar is less likely to vibrate. Therefore, it is possible to desirably detect objects such as other vehicles forward.

According to a preferred embodiment, the radar includes a casing that has a left wall and a right wall, and a radar connector that is removably connected to a connector connected to a wire harness. The radar connector is provided on the left wall or the right wall of the casing.

According to the embodiment described above, with the connector connected to the radar connector, the wire harness does not protrude upward or downward of the casing. The dimension of the radar and the wire harness in the up-down direction can be made compact.

According to a preferred embodiment, the straddled vehicle includes a base stay cantilevered on the head pipe. The radar is supported on the base stay.

According to the embodiment described above, the radar is cantilevered on the head pipe with the base stay therebetween. However, since the distance between the radar and the vehicle body frame in the front-rear direction is short as described above, the radar is less likely to vibrate.

According to a preferred embodiment, the straddled vehicle includes a headlight supported on the base stay.

According to the embodiment described above, the radar and the headlight can be supported by a common base stay.

According to a preferred embodiment, the headlight includes a left headlight arranged leftward of the radar and a right headlight arranged rightward of the radar.

According to the embodiment described above, the amount of light of the headlight as a whole is the sum of the amount of light of the left headlight and the amount of light of the right headlight. It is possible to arrange the radar near the center of the straddled vehicle while ensuring a sufficient amount of light of the headlight as a whole.

According to a preferred embodiment, the left headlight and the right headlight overlap with the front fork and the radar does not overlap with the front fork as the vehicle is viewed from the front.

According to the embodiment described above, it is possible to ensure a sufficient space for installment of the radar without being interfered by the front fork.

According to a preferred embodiment, the straddled vehicle includes: a headlight stay to which the headlight is fixed; a headlight pivot that pivotally supports the headlight stay on the base stay; and a headlight aiming screw that couples together the base stay and the headlight stay. A hole in which a tool for turning the headlight aiming screw is able to be inserted is formed in the headlight stay or the base stay. An orientation of the headlight is adjusted by turning the headlight aiming screw. The hole does not overlap with the front cover as the vehicle is viewed from the front.

According to the embodiment described above, without removing the front cover, it is possible to insert a tool such as a screwdriver in the hole to turn the headlight aiming screw. Without removing the front cover, it is possible to perform the operation of adjusting the orientation of the headlight.

According to a preferred embodiment, the straddled vehicle includes: a radar stay to which the radar is fixed; a radar pivot that pivotally supports the radar stay on the base stay; and a radar aiming screw that couples together the base stay and the radar stay. A hole in which a tool for turning the radar aiming screw is able to be inserted is formed in the radar stay or the base stay. An orientation of the radar is adjusted by turning the radar aiming screw. The hole does not overlap with the front cover as the vehicle is viewed from the front.

According to the embodiment described above, without removing the front cover, it is possible to insert a tool such as a screwdriver in the hole to turn the radar aiming screw. Without removing the front cover, it is possible to perform the operation of adjusting the orientation of the radar.

According to a preferred embodiment, the radar pivot is a ball joint. The radar aiming screw includes a first aiming screw arranged leftward or rightward of the ball joint, and a second aiming screw arranged upward or downward of the ball joint.

According to the embodiment described above, the orientation of the radar in the left-right direction and that in the up-down direction can be adjusted independently. Thus, it is possible to easily perform the operation of adjusting the orientation of the radar. It is possible to easily adjust the orientation of the radar to a desired orientation.

Advantageous Effects of Invention

According to the present invention, it is possible to provide a straddled vehicle capable of desirably detecting objects such as other vehicles forward by a radar.

DETAILED DESCRIPTION OF THE PREFERRED EMBODIMENTS

Figure 1:
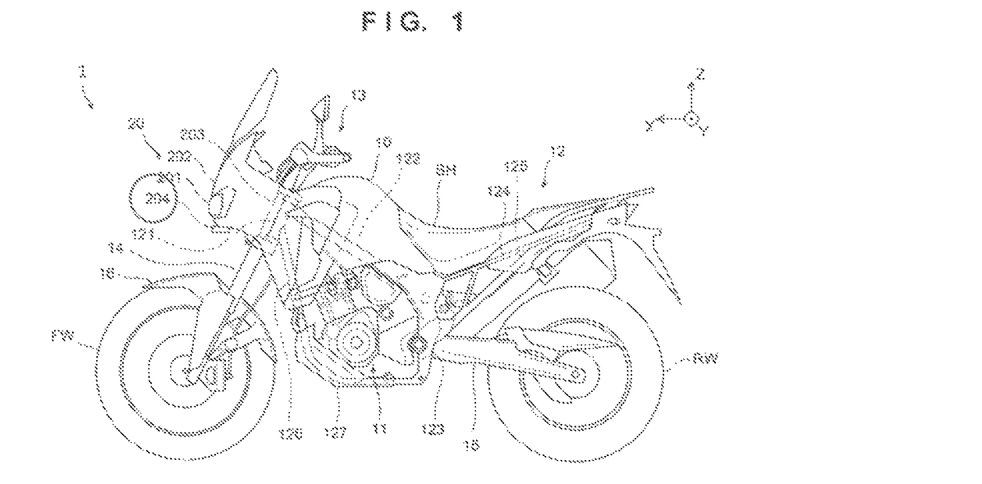
FIG. 1 is a left side view showing a motorcycle according to one embodiment.

A straddled vehicle according to an embodiment will now be described. FIG. 1 is a left side view showing a motorcycle 1, which is an example of the straddled vehicle.

The terms front, rear, left, right, up and down, as used in the description below, refer to these directions as seen from a virtual passenger (not shown) seated on a seat 2 while the motorcycle 1 is standing upright on a horizontal surface with no passenger and no load thereon, unless specified otherwise. The designations F, Re, L, R, U and D, as used in the figures, refer to front, rear, left, right, up and down, respectively.

The term "forward" refers not only to the direction that extends in the front direction along the vehicle center line CL (see FIG. 4), as the vehicle is viewed from above, but also to directions that are inclined in the left-right direction from that direction by an angle that is less than 90 degrees. Similarly, the term "rearward" refers not only to the direction that extends rearward along the vehicle center line CL, as the vehicle is viewed from above, but also to directions that are inclined in the left-right direction from that direction by an angle that is less than 90 degrees. The term "leftward" refers not only to the direction that extends leftward vertical to the vehicle center line CL, as the vehicle is viewed from above, but also to directions that are inclined in the front-rear direction from that direction by an angle that is less than 90 degrees. The term "rightward" refers not only to the direction that extends rightward vertical to the vehicle center line CL, as the vehicle is viewed from above, but also to directions that are inclined in the front-rear direction from that direction by an angle that is less than 90 degrees. The term "upward" refers not only to the vertically upward direction, as the vehicle is viewed from the side, but also to directions that are inclined in the front-rear direction from that direction by an angle that is less than 90 degrees. The term "downward" refers not only to the vertically downward direction, as the vehicle is viewed from the side, but also to directions that are inclined in the front-rear direction from that direction by an angle that is less than 90 degrees.

The motorcycle 1 includes a vehicle body frame 10, an engine 3 supported on the vehicle body frame 10, the seat 2 supported on the vehicle body frame 10, a front wheel 4 and a rear wheel 5. A fuel tank 6 is arranged forward of the seat 2. The engine 3 and the rear wheel 5 are connected together by a chain 7. The engine 3 is a drive source. The chain 7 is an example of a power transmission member for transmitting the power from the drive source to the rear wheel 5. The rear wheel 5 is rotatably supported on the rear end portion of a rear arm 8. The front end portion of the rear arm 8 is pivotally supported on the vehicle body frame 10 by a pivot shaft 9.

Figure 2:
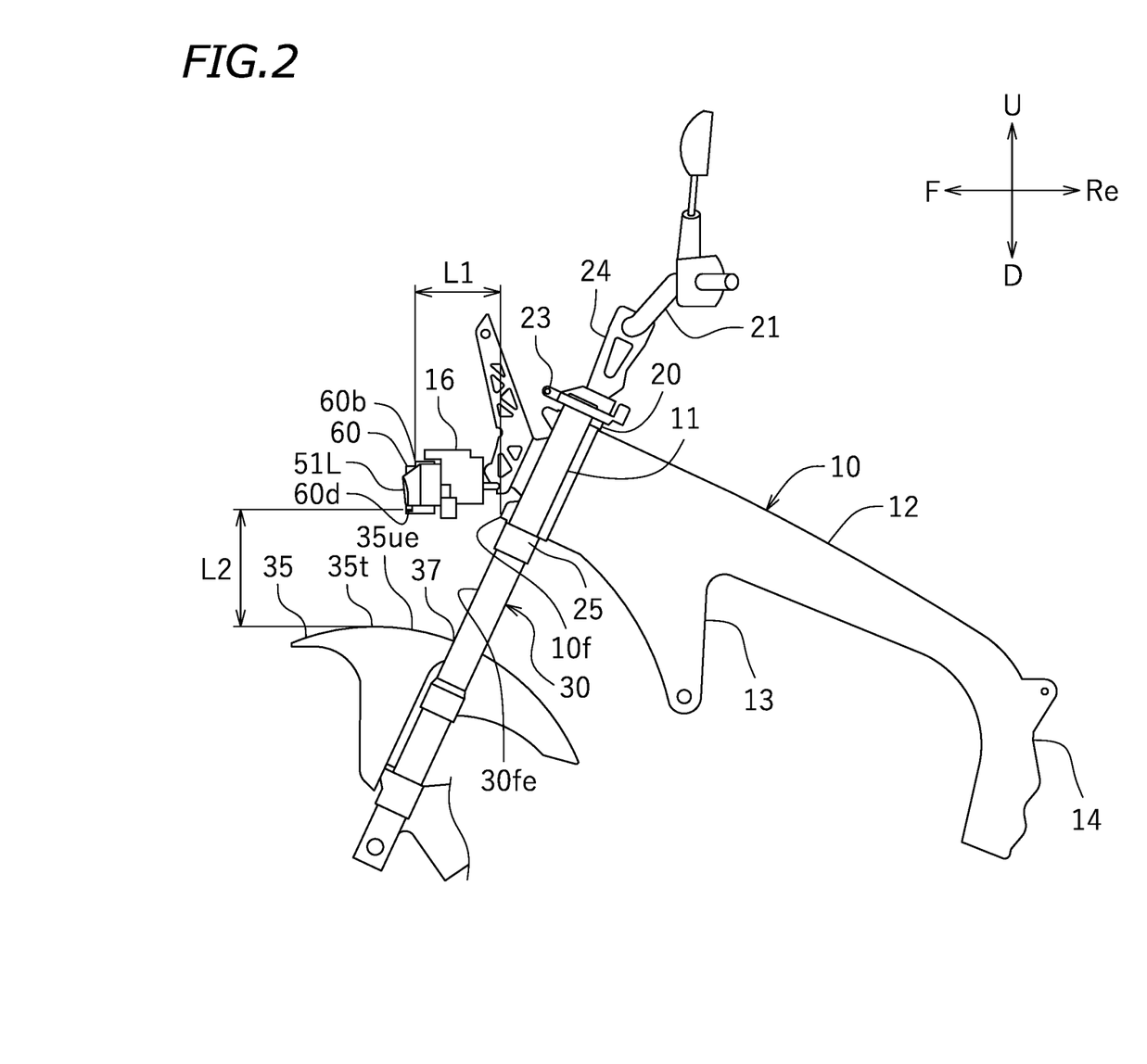
FIG. 2 is a left side view showing a main part of the motorcycle.

As shown in FIG. 2, the vehicle body frame 10 includes a head pipe 11 extending downward and forward, a main frame 12 extending rearward from the head pipe 11, and a down frame 13 and a down frame 14 extending downward from the main frame 12. The engine 3 is supported on the down frame 13 and the down frame 14 (see FIG. 1). While there is no particular limitation on the material of the vehicle body frame 10, the vehicle body frame 10 is made of a metal.

A steering shaft 20 is inserted in the head pipe 11. The steering shaft 20 is supported on the head pipe 11 and being rotatable left and right. A top bridge 23 and an under bracket 25 are fixed to the steering shaft 20. The top bridge 23 is arranged upward of the head pipe 11. The under bracket 25 is arranged downward of the head pipe 11. A handle bracket 24 is fixed to the top bridge 23. A handle bar 21 is fixed to the handle bracket 24. Although not shown in the figures, a left grip is attached to a left end portion of the handle bar 21, and a right grip is attached to a right end portion of the handle bar 21.

Figure 3:
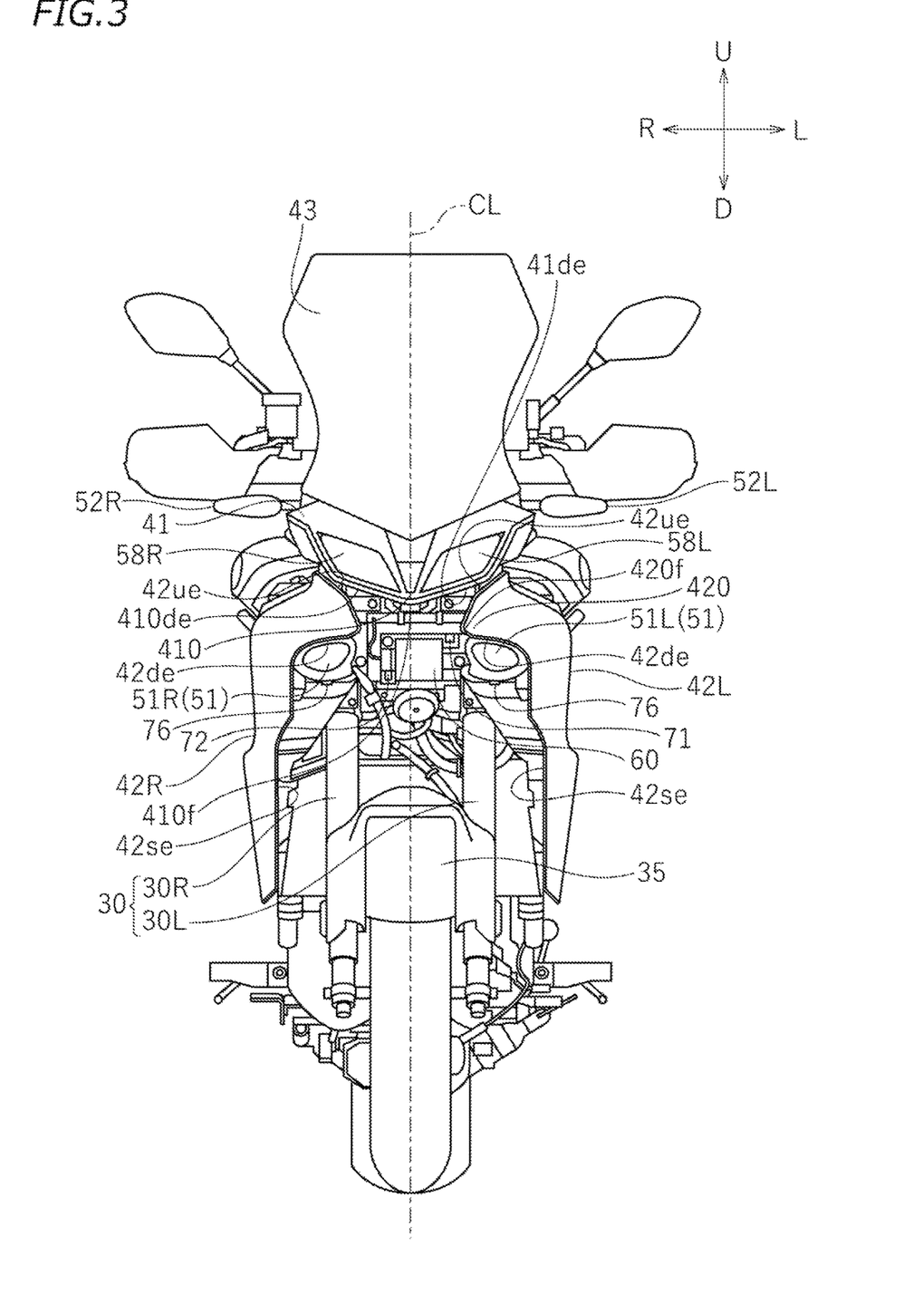
FIG. 3 is a partial front view showing the motorcycle.
Figure 4:
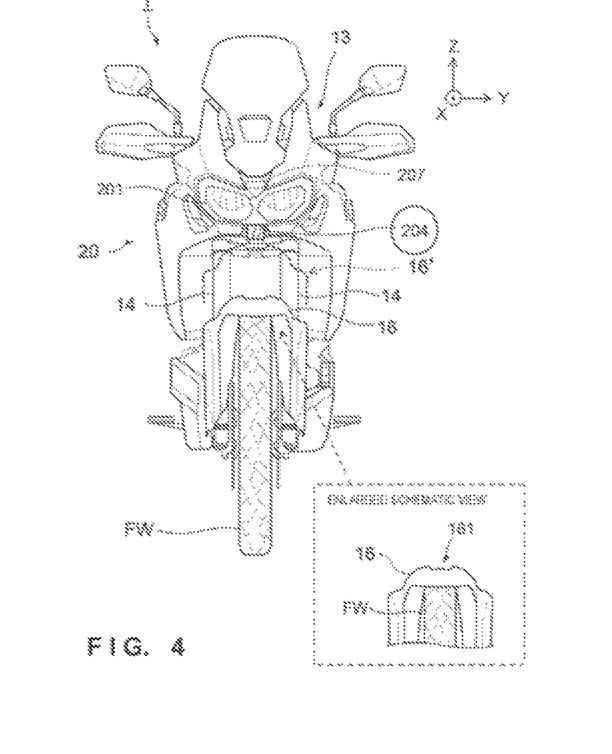
FIG. 4 is a plan view showing a main part of the motorcycle.

As shown in FIG. 1, the front wheel 4 is rotatably supported on a lower end portion of a front fork 30. The front fork 30 is fixed to the top bridge 23 and the under bracket 25. The front fork 30 is connected to the steering shaft 20 with the top bridge 23 and the under bracket 25 therebetween. As shown in FIG. 3, the front fork 30 includes a left tube 30L and a right tube 30R arranged rightward of the left tube 30L. As the vehicle is viewed from the front, the left tube 30L is arranged leftward of the vehicle center line CL, and the right tube 30R is arranged rightward of the vehicle center line CL. As shown in FIG. 4, the left tube 30L and the right tube 30R are fixed to the top bridge 23 and the under bracket 25. As shown in FIG. 2, as the vehicle is viewed from the side, the front fork 30 has a front edge 30*fe*. As the vehicle is viewed from the side, the front edge 30*fe* extends downward and forward.

As shown in FIG. 2, the front fork 30 supports a front fender 35. At least a portion of the front fender 35 is arranged upward of the front wheel 4. The front fender 35 has an upper edge 35*ue* as the vehicle is viewed from the side. Here, the upper edge 35*ue* is formed in an arc shape. Note however that there is no particular limitation on the shape of the upper edge 35*ue*.

As shown in FIG. 1, the motorcycle 1 includes a front cover 40. At least a portion of the front cover 40 is arranged forward relative to the head pipe 11 (see FIG. 2). In the present embodiment, the front cover 40 includes a front cowl 41, a left side cowl 42L, a right side cowl 42R and a windshield 43 (see FIG. 3). The front cowl 41, the left side cowl 42L, the right side cowl 42R and the windshield 43 are formed separately from each other.

As shown in FIG. 3, the front cowl 41 overlaps with the vehicle center line CL as the vehicle is viewed from the front. The front cowl 41 is arranged so as to extend from the left side of the vehicle center line CL to the right side of the vehicle center line CL. The front cowl 41 is arranged forward of the head pipe 11. As the vehicle is viewed from the front, the front cowl 41 overlaps with the head pipe 11. As shown in FIG. 1, the front cowl 41 has a projecting portion 410 that is projecting forward as the vehicle is viewed from the side. Note that "projecting forward as the vehicle is viewed from the side" refers to the projection that is defined by an upper edge extending upward and rearward and a lower edge extending downward and rearward as the vehicle is viewed from the side. As shown in FIG. 3, the front cowl 41 has a lower edge 41*de* extending leftward and rightward from a front end 410*f* of the projecting portion 410 as the vehicle is viewed from the front.

As shown in FIG. 3, the left side cowl 42L is arranged leftward of the vehicle center line CL and the right side cowl 42R is arranged rightward of the vehicle center line CL as the vehicle is viewed from the front. The left side cowl 42L and the right side cowl 42R are separate from each other. While there is no particular limitation, the left side cowl 42L and the right side cowl 42R are shaped in left-right symmetry with respect to the vehicle center line CL in the present embodiment.

As shown in FIG. 1, an upper end 42*t* of the left side cowl 42L and the right side cowl 42R is located downward relative to an upper end 41*t* of the front cowl 41. A lower end 42*d* of the left side cowl 42L and the right side cowl 42R is located downward relative to the lower end of the front cowl 41. Note that in the present embodiment, the front end 410*f* of the front cowl 41 is the lower end of the front cowl 41.

The left side cowl 42L has a projecting portion 420 that is projecting forward as the vehicle is viewed from the side. Similarly, the right side cowl 42R also has a projecting portion 420 that is projecting forward. As shown in FIG. 3, the left side cowl 42L and the right side cowl 42R each have a lower edge 42*de* extending leftward or rightward as the vehicle is viewed from the front. Here, the lower edge 42*de* of the left side cowl 42L extends leftward from a front end 420*f* of the projecting portion 420 of the left side cowl 42L. The lower edge 42*de* of the right side cowl 42R extends rightward from the front end 420*f* of the projecting portion 420 of the right side cowl 42R. At least a portion of the lower edge 42*de* is located at or below the front end 420*f* of the projecting portion 420. Here, the entirety of the lower edge 42*de* is located at or below the front end 420*f* of the projecting portion 420.

The left side cowl 42L and the right side cowl 42R each have a vertical edge 42*se* extending downward from the outward end portion of the lower edge 42*de* in the vehicle width direction as the vehicle is viewed from the front. Specifically, the left side cowl 42L has the vertical edge 42*se* extending downward from the left end of the lower edge 42*de* of the left side cowl 42L as the vehicle is viewed from the front. The right side cowl 42R has the vertical edge 42*se* extending downward from the right end of the lower edge 42*de* of the right side cowl 42R as the vehicle is viewed from the front. As shown in FIG. 1, the vertical edges 42*se* of the left side cowl 42L and the right side cowl 42R extend downward and rearward as the vehicle is viewed from the side.

As shown in FIG. 3, the left side cowl 42L and the right side cowl 42R each have an upper edge 42*ue* extending upward and outward in the vehicle width direction from the front end 420*f* of the projecting portion 420 as the vehicle is viewed from the front. Specifically, the left side cowl 42L has the upper edge 42*ue* extending upward and leftward from the front end 420*f* of the projecting portion 420 of the left side cowl 42L as the vehicle is viewed from the front. The right side cowl 42R has the upper edge 42*ue* extending upward and rightward from the front end 420*f* of the projecting portion 420 of the right side cowl 42R as the vehicle is viewed from the front. As shown in FIG. 1, the upper edges 42*ue* of the left side cowl 42L and the right side cowl 42R extend upward and rearward as the vehicle is viewed from the side.

The windshield 43 is arranged upward of the front cowl 41. The windshield 43 is arranged upward of the left side cowl 42L and the right side cowl 42R. As shown in FIG. 3, the windshield 43 overlaps with the vehicle center line CL as the vehicle is viewed from the front.

As shown in FIG. 1, the left side cowl 42L and the front fender 35 are separate from each other as the vehicle is viewed from the side. The front cover 40 and the front fender 35 are separate from each other as the vehicle is viewed from the side. An intersection 37 does not overlap with the left side cowl 42L as the vehicle is viewed from the side. The intersection 37 does not overlap with the front cover 40 as the vehicle is viewed from the side.

As shown in FIG. 3, the motorcycle 1 includes a left flasher 52L and a right flasher 52R. The left flasher 52L and the right flasher 52R are direction indicators. The left flasher 52L is operated to blink when the motorcycle 1 is turning left. The right flasher 52R is operated to blink when the motorcycle 1 is turning right.

The motorcycle 1 includes a headlight 51 including a left headlight 51L and a right headlight 51R. The headlight 51 is a front illumination that illuminates the area forward of the motorcycle 1. In the present embodiment, the headlight 51 is arranged downward of the left flasher 52L and the right flasher 52R. The left headlight 51L is arranged downward of the left flasher 52L, and the right headlight 51R is arranged downward of the right flasher 52R. A left light 58L including a left cornering light and a left position lamp and a right light 58R including a right cornering light and a right position lamp are attached to the front cowl 41. The left headlight 51L is arranged downward of the left light 58L. The right headlight 51R is arranged downward of the right light 58R. At least a portion of the left headlight 51L is arranged downward of the lower edge 42*de* of the left side cowl 42L. At least a portion of the right headlight 51R is arranged downward of the lower edge 42*de* of the right side cowl 42R. The left headlight 51L and the right headlight 51R overlap with the front fork 30 as the vehicle is viewed from the front. The left headlight 51L overlaps with the left tube 30L and the right headlight 51R overlaps with the right tube 30R.

The motorcycle 1 has a radar 60 for detecting objects such as other vehicles forward. Although not shown in the figures, the radar 60 includes a transmitter that transmits electromagnetic waves and a receiver that receives reflected waves that have been reflected off objects such as other vehicles forward. In the present embodiment, the transmitter is configured to transmits millimeter waves. The radar 60 is a so-called millimeter wave radar. Note however that there is no particular limitation thereto. The radar 60 may be configured to transmit and receive electromagnetic waves other than millimeter waves.

As shown in FIG. 1, the front cover 40 includes a plurality of projecting portions 410 and 420 as the vehicle is viewed from the side. In the present embodiment, the front end 420*f* of the projecting portion 420 of the left side cowl 42L and the right side cowl 42R is located forward relative to the front end 410*f* of the projecting portion 410 of the front cowl 41. The front end 420*f* of the left side cowl 42L and the right side cowl 42R is the front end of the front cover 40. The front end 420*f* of the front cover 40 is provided on the projecting portion 420 that is located lowermost among the plurality of projecting portions 410 and 420.

At least a portion of the radar 60 is arranged downward relative to the front end 420*f* of the front cover 40. At least a portion of the radar 60 is arranged upward relative to the front fender 35. As shown in FIG. 3, at least a portion of the radar 60 is arranged downward relative to the lower edge 42*de* of the front cover 40. In the present embodiment, the entirety of the radar 60 is arranged downward relative to the front end 420*f* of the front cover 40 and upward relative to the front fender 35. The radar 60 is arranged downward relative to the front cowl 41.

The radar 60 is arranged relative to the left side cowl 42L and leftward relative to the right side cowl 42R. The radar 60 overlaps with the vehicle center line CL as the vehicle is viewed from the front.

As shown in FIG. 1, the radar 60 is arranged forward relative to the intersection 37 between the front edge 30*fe* of the front fork 30 and the upper edge 35*ue* of the front fender 35 as the vehicle is viewed from the side. The radar 60 is arranged relatively forward.

Figure 5:
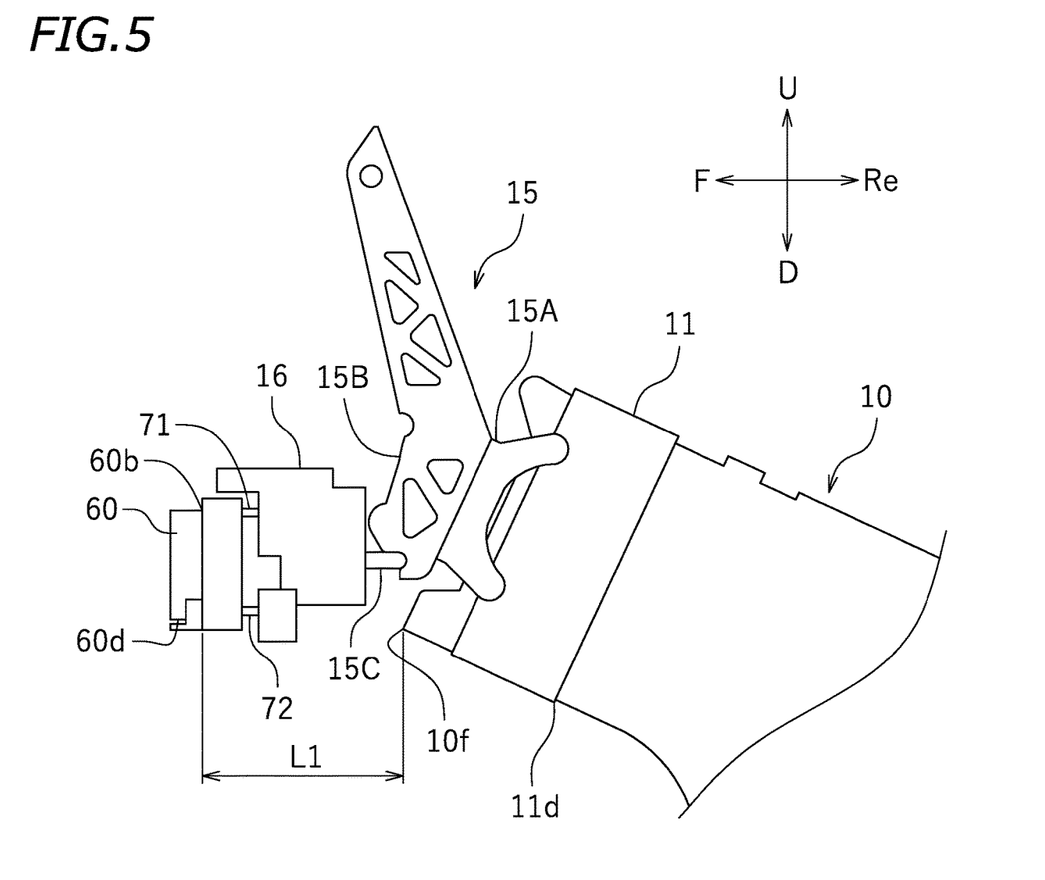
FIG. 5 is a left side view showing a radar support structure.

As shown in FIG. 5, the radar 60 is supported on the vehicle body frame 10. Note that "supported on the vehicle body frame 10" refers both to being supported directly on the vehicle body frame 10 and to being supported indirectly on the vehicle body frame 10 with other members therebetween. In the present embodiment, the radar 60 is supported indirectly on the vehicle body frame 10 as will be described below.

As shown in FIG. 5, a support bracket 15 is fixed to the head pipe 11. The support bracket 15 includes a bracket 15A attached directly to the head pipe 11, a bracket 15B fixed to the bracket 15A, and left and right arms 15C extending forward from the bracket 15B (see FIG. 4). A base stay 16 is fixed to the left and right arms 15C. The base stay 16 is arranged forward of the head pipe 11. The base stay 16 is cantilevered to the head pipe 11 with the support bracket 15 therebetween. Although not shown in the figures, a bracket is attached to the left-side portion of the base stay 16, and the left side cowl 42L is connected to this bracket. A bracket is attached to the right-side portion of the base stay 16, and the right side cowl 42R is connected to this bracket.

As shown in FIG. 5, the radar 60 is supported on the base stay 16. The radar 60 is arranged forward of the head pipe 11. The radar 60 is cantilevered on the head pipe 11 with the support bracket 15 and the base stay 16 therebetween. The radar 60 is arranged forward of the vehicle body frame 10. The distance L1 between a rear end 60*b* of the radar 60 and a front end 10*f* of the vehicle body frame 10 in the front-rear direction is shorter than the distance L2 (see FIG. 2) between a lower end 60*d* of the radar 60 and an upper end 35*t* of the front fender 35 in the up-down direction. The distance between the radar 60 and the vehicle body frame 10 in the front-rear direction is relatively short.

Figure 6:
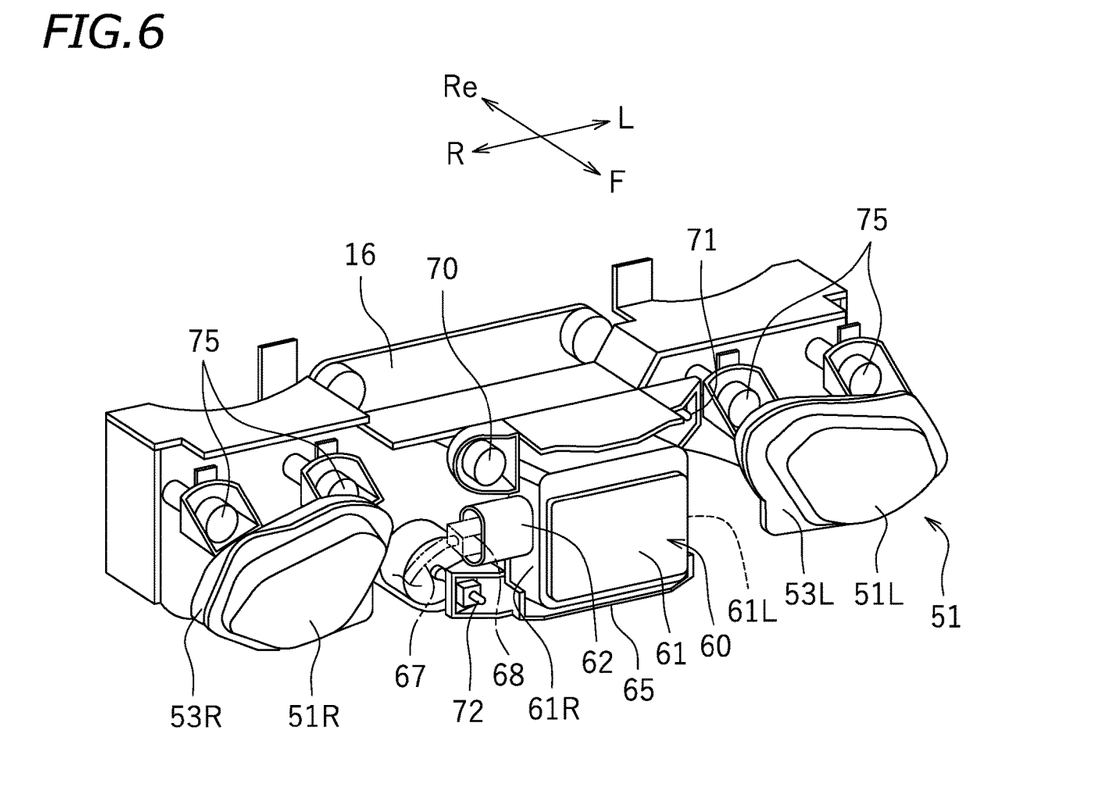
FIG. 6 is a perspective view showing a radar, a left headlight, a right headlight, a base stay, etc., as viewed from above.

As shown in FIG. 6, the radar 60 is fixed to the radar stay 65. The radar stay 65 is supported on the base stay 16. An upper right portion of the radar stay 65 is coupled to the base stay 16 by a radar pivot 70, which is a ball joint. This allows the radar stay 65 to pivot up, down, left and right relative to the base stay 16.

Figure 7:
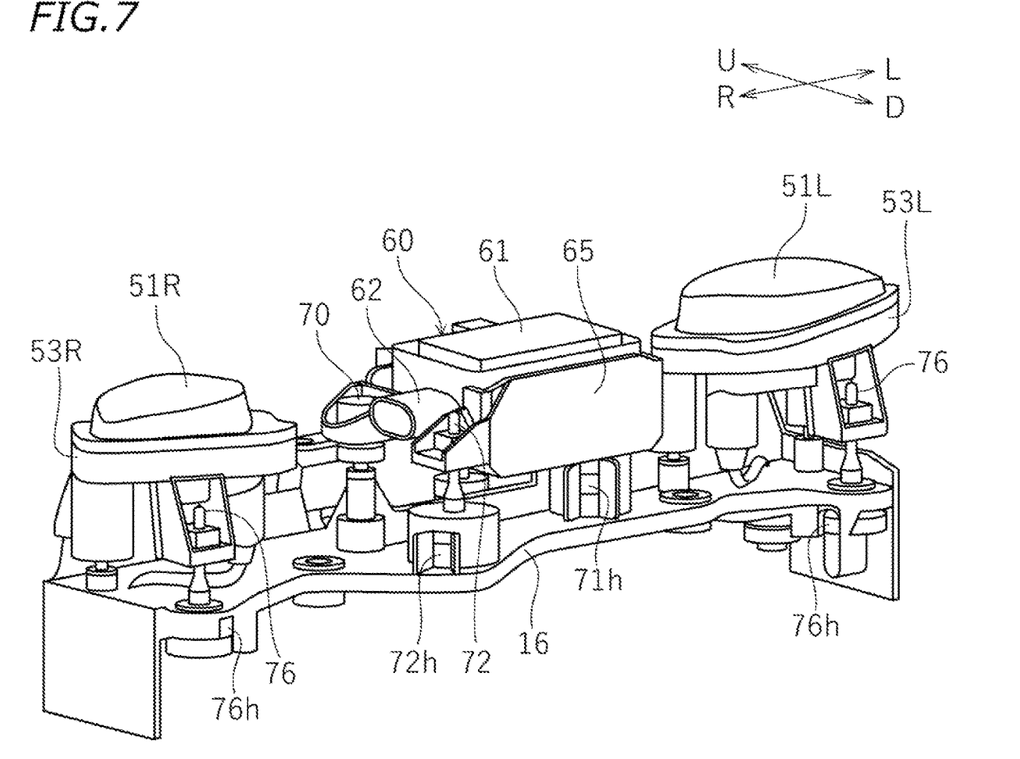
FIG. 7 is a perspective view showing a radar, a left headlight, a right headlight, a base stay, etc., as viewed from below.

An upper left portion of the radar stay 65 is coupled to the base stay 16 by a first aiming screw 71. The first aiming screw 71 is arranged leftward of the radar pivot 70. As shown in FIG. 7, the base stay 16 has a hole 71*h* in which a tool (not shown) for turning the first aiming screw 71 is able to be inserted. The hole 71*h* is open downward. Note that while there is no particular limitation on the tool, it may preferably be a tool such as a screwdriver, for example. By turning the first aiming screw 71 in a predetermined direction, which is the clockwise direction or the counterclockwise direction, the upper left portion of the radar stay 65 moves rearward toward the base stay 16. This tilts the radar stay 65 leftward, thereby tilting the radar 60 leftward. Conversely, by turning the first aiming screw 71 in the other direction, the upper left portion of the radar stay 65 moves forward away from the base stay 16. This tilts the radar stay 65 rightward, thereby tilting the radar 60 rightward. Thus, by turning the first aiming screw 71, it is possible to adjust the orientation of the radar 60 in the left-right direction. The first aiming screw 71 is an example of an aiming screw for adjusting the orientation of the radar 60 in the left-right direction. Note that the first aiming screw 71 may be arranged rightward of the radar pivot 70. The first aiming screw 71 may be arranged at the same height as the radar pivot 70, or may be arranged upward or downward relative to the radar pivot 70. The hole 71*h* may be formed in the radar stay 65.

The lower right portion of the radar stay 65 is coupled to the base stay 16 by a second aiming screw 72. The second aiming screw 72 is arranged downward of the radar pivot 70. As shown in FIG. 7, the base stay 16 has a hole 72*h* in which a tool (not shown) for turning the second aiming screw 72 is able to be inserted. The hole 72*h* is open downward. By turning the second aiming screw 72 in one direction, the lower right portion of the radar stay 65 moves rearward toward the base stay 16. This tilts the radar stay 65 downward, thereby tilting the radar 60 downward. Conversely, by turning the second aiming screw 72 in the other direction, the lower right portion of the radar stay 65 moves forward away from the base stay 16. This tilts the radar stay 65 upward, thereby tilting the radar 60 upward. Thus, by turning the second aiming screw 72, it is possible to adjust the orientation of the radar 60 in the up-down direction. The second aiming screw 72 is an example of an aiming screw for adjusting the orientation of the radar 60 in the up-down direction. Note that the second aiming screw 72 may be arranged upward of the radar pivot 70. The position of the second aiming screw 72 in the left-right direction may coincide with the position of the radar pivot 70 in the left-right direction, or the second aiming screw 72 may be arranged leftward or rightward relative to the radar pivot 70. The hole 72*h* may be formed in the radar stay 65.

As shown in FIG. 3, the first aiming screw 71 and the second aiming screw 72 do not overlap with the front cover 40 as the vehicle is viewed from the front. The hole 71*h* and the hole 72*h* do not overlap with the front cover 40 as the vehicle is viewed from the front. The first aiming screw 71, the second aiming screw 72, the hole 71*h* and the hole 72*h* do not overlap with any of the front cowl 41, the left side cowl 42L and the right side cowl 42R as the vehicle is viewed from the front. As described above, the hole 71*h* in which a tool for turning the first aiming screw 71 is able to be inserted and the hole 72*h* in which a tool for turning the second aiming screw 72 is able to be inserted are open downward (see FIG. 7). The front cover 40 does not interfere with the insertion of the tool in the hole 71*h* and the insertion of the tool in the hole 72*h*. It is possible to easily adjust the orientation of the radar 60 up, down, left and right without being interfered by the front cover 40.

As shown in FIG. 6, the radar 60 includes a casing 61 that houses a transmitter and a receiver (not shown), and a connector 62. The connector 62 is electrically connected to the transmitter and the receiver. The casing 61 has a left wall 61L and a right wall 61R. Here, the connector 62 is provided on the right wall 61R. Note however that the connector 62 may be provided on the left wall 61L. A connector 68 connected to a wire harness 67 is removably connected to the connector 62. The radar 60 is connected to a controller (not shown) by the wire harness 67.

The left headlight 51L is fixed to a left headlight stay 53L. The right headlight 51R is fixed to a right headlight stay 53R. The left headlight stay 53L and the right headlight stay 53R are supported on the base stay 16. An upper left portion and an upper right portion of the left headlight stay 53L are coupled to the base stay 16 by a headlight pivot e75, which is a ball joint. Similarly, an upper left portion and an upper right portion of the right headlight stay 53R are coupled to the base stay 16 by the headlight pivot 75, which is a ball joint. Thus, the left headlight stay 53L and the right headlight stay 53R are pivotable relative to the base stay 16.

Figure 8:
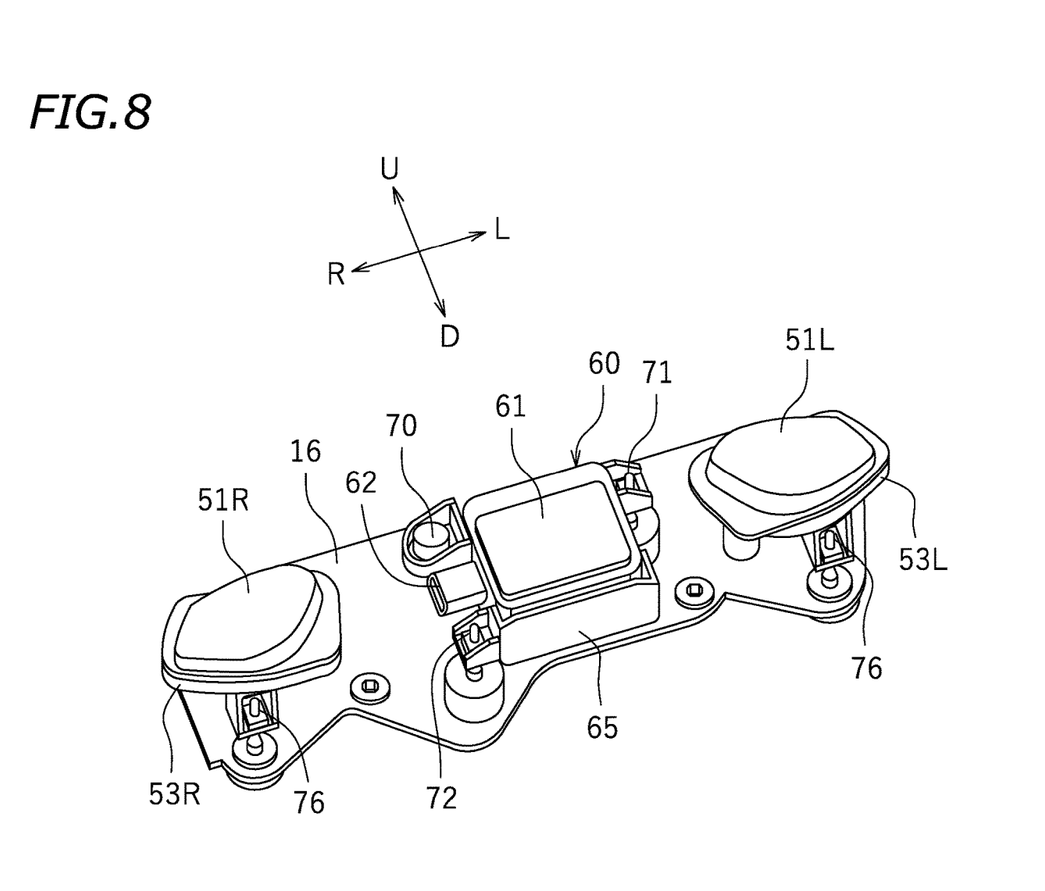
FIG. 8 is another perspective view showing a radar, a left headlight, a right headlight, a base stay, etc., as viewed from below.

As shown in FIG. 8, a lower portion of each of the left headlight stay 53L and the right headlight stay 53R is coupled to the base stay 16 by an aiming screw 76. The aiming screw 76 is arranged downward of the headlight pivot 75. As shown in FIG. 7, a hole 76h in which a tool (not shown) for turning the aiming screw 76 is inserted is formed in the base stay 16. The hole 76h is open downward. By turning the aiming screw 76 in one direction, the lower portion of the left headlight stay 53L and the right headlight stay 53R moves rearward toward the base stay 16, thereby tilting the left headlight 51L and the right headlight 51R downward. Conversely, by turning the aiming screw 76 in the other direction, the lower portion of the left headlight stay 53L and the right headlight stay 53R moves forward away from the base stay 16, thereby tilting the left headlight 51L and the right headlight 51R upward. Thus, by turning the aiming screw 76, it is possible to adjust the orientation of the left headlight 51L and the right headlight 51R. The aiming screw 76 is an example of a headlight aiming screw for adjusting the orientation of the left headlight 51L and the right headlight 51R. Note that the hole 76h may be formed in the left headlight stay 53L and the right headlight stay 53R.

As shown in FIG. 3, the aiming screw 76 and the hole 76h do not overlap with the front cover 40 as the vehicle is viewed from the front. The aiming screw 76 and the hole 76h do not overlap with any of the front cowl 41, the left side cowl 42L and the right side cowl 42R. As described above, the hole 76h in which a tool for turning the aiming screw 76 is inserted is open downward. The front cover 40 does not interfere with the insertion of the tool in the hole 76h. It is possible to easily adjust the orientation of the left headlight 51L and the right headlight 51R without being interfered by the front cover 40.

The motorcycle 1 is configured as described above. Next, various effects to be realized by the motorcycle 1 will be described.

As shown in FIG. 5, the radar 60 is arranged forward of the head pipe 11. Here, the head pipe 11 extends downward and forward. Therefore, the more downward the radar 60 is arranged, the shorter the distance between the radar 60 and the vehicle body frame 10 in the front-rear direction. In the present embodiment, as shown in FIG. 1, at least a portion of the radar 60 is arranged downward relative to the front end 420f of the front cover 40. As shown in FIG. 3, at least a portion of the radar 60 is arranged downward relative to the lower edge 42de of the front cover 40 and upward relative to the front fender 35. Thus, the radar 60 is arranged relatively downward. Therefore, even if the radar 60 is arranged relatively forward, the distance between the radar 60 and the vehicle body frame 10 in the front-rear direction does not become long. Although the radar 60 is cantilevered on the vehicle body frame 10, the radar 60 is less likely to vibrate while the motorcycle 1 is running. Therefore, with the motorcycle 1 according to the present embodiment, it is possible with the radar 60 to desirably detect objects such as other vehicles forward.

While the front cover 40 has a plurality of projecting portions 410 and 420 as the vehicle is viewed from the side as shown in FIG. 1, the front end 420f of the front cover 40 is provided on the projecting portion 420 that is located lowermost among the plurality of projecting portions 410 and 420. At least a portion of the radar 60 is arranged downward relative to the front end 420f of the projecting portion 420 that is located lowermost. The radar 60 is arranged more downward. Therefore, even if the radar 60 is arranged more forward, the distance between the radar 60 and the vehicle body frame 10 in the front-rear direction does not become long, and the radar 60 is less likely to vibrate. Therefore, it is possible with the radar 60 to desirably detect objects such as other vehicles forward.

According to the present embodiment, the radar 60 is arranged downward relative to the front cowl 41 (see FIG. 3). The radar 60 is arranged relatively downward. Therefore, the radar 60 is less likely to vibrate. It is possible with the radar 60 to desirably detect objects such as other vehicles forward.

According to the present embodiment, the radar 60 is arranged rightward relative to the left side cowl 42L and leftward relative to the right side cowl 42R (see FIG. 3). The radar 60 is arranged near the center of the motorcycle 1. Therefore, it is possible to desirably detect objects such as other vehicles forward.

According to the present embodiment, as shown in FIG. 1, the radar 60 is arranged forward relative to the intersection 37 between the front edge 30fe of the front fork 30 and the upper edge 35ue of the front fender 35 as the vehicle is viewed from the side. The radar 60 is arranged relatively forward. Therefore, it is possible to desirably detect objects such as other vehicles forward.

According to the present embodiment, as shown in FIG. 2, the distance L1 between the rear end 60b of the radar 60 and the front end 10f of the vehicle body frame 10 in the front-rear direction is shorter than the distance L2 between the lower end 60d of the radar 60 and the upper end 35t of the front fender 35 in the up-down direction. Since the distance between the radar 60 and the vehicle body frame 10 in the front-rear direction is short, the radar 60 is less likely to vibrate. Therefore, it is possible to desirably detect objects such as other vehicles forward.

According to the present embodiment, as shown in FIG. 6, the connector 62 of the radar 60 is provided on the right wall 61R of the casing 61. Therefore, with the connector 68 connected to the connector 62, the wire harness 67 does not protrude upward or downward of the casing 61. The dimension of the radar 60 and the wire harness 67 in the up-down direction can be made compact. Note that the connector 62 of the radar 60 may be provided on the left wall 61L of the casing 61. Similar effects can be realized also in this case.

According to the present embodiment, the radar 60 is supported on the base stay 16 cantilevered on the head pipe 11 (see FIG. 5). The radar 60 is cantilevered on the head pipe 11 with the base stay 16 therebetween. However, since the distance between the radar 60 and the vehicle body frame 10 in the front-rear direction is short as described above, the radar 60 is less likely to vibrate. Therefore, it is possible to desirably detect objects such as other vehicles forward.

According to the present embodiment, the left headlight 51L and the right headlight 51R are supported on the base stay 16 (see FIG. 4). The radar 60 and the headlights 51L and 51R can be supported on the common base stay 16.

According to the present embodiment, the headlight 51 is not a single light, but includes the left headlight 51L and the right headlight 51R. The amount of light of the headlight 51 is the sum of the amount of light of the left headlight 51L and the amount of light of the right headlight 51R. Thus, it is possible to arrange the radar 60 near the center of the motorcycle 1 while ensuring a sufficient amount of light of the headlight 51 as a whole.

According to the present embodiment, as shown in FIG. 3, the left headlight 51L and the right headlight 51R overlap with the front fork 30 and the radar 60 does not overlap with the front fork 30 as the vehicle is viewed from the front. It is possible to ensure a sufficient space for installment of the radar 60 without being interfered by the front fork 30.

According to the present embodiment, by turning the aiming screw 76 (see FIG. 8), it is possible to adjust the orientation of the left headlight 51L and the right headlight 51R. As shown in FIG. 3, the aiming screw 76 and the hole 76h do not overlap with the front cover 40 as the vehicle is viewed from the front. The area downward of the hole 76h is not covered by the front cover 40. Therefore, without removing the front cover 40, it is possible to insert a tool such as a screwdriver in the hole 76h to turn the aiming screw 76. Without removing the front cover 40, it is possible to perform the operation of adjusting the orientation of the left headlight 51L and the right headlight 51R.

According to the present embodiment, by turning the first aiming screw 71 and the second aiming screw 72 (see FIG. 6), it is possible to adjust the orientation of the radar 60. As shown in FIG. 3, the first aiming screw 71 and the second aiming screw 72 do not overlap with the front cover 40 as the vehicle is viewed from the front. The hole 71h and the hole 72h do not overlap with the front cover 40 as the vehicle is viewed from the front. The areas downward of the hole 71h and the hole 72h are not covered by the front cover 40. Therefore, without removing the front cover 40, it is possible to insert a tool such as a screwdriver in the hole 71h and the hole 72h to turn the first aiming screw 71 and the second aiming screw 72. Without removing the front cover 40, it is possible to perform the operation of adjusting the orientation of the radar 60.

According to the present embodiment, as shown in FIG. 6, radar aiming screws for adjusting the orientation of the radar 60 include the first aiming screw 71 located leftward of the radar pivot 70, which is a ball joint, and the second aiming screw 72 located downward of the radar pivot 70. By turning the first aiming screw 71, it is possible to adjust the orientation of the radar 60 in the left-right direction. By turning the second aiming screw 72, it is possible to adjust the orientation of the radar 60 in the up-down direction. The orientation of the radar 60 in the left-right direction and that in the up-down direction can be adjusted independently. Thus, it is possible to easily perform the operation of adjusting the orientation of the radar 60. It is possible to easily adjust the orientation of the radar 60 to a desired orientation.

While one embodiment has been described above, the embodiment is merely an example. Various other embodiments are possible. Next, examples of other embodiments will be described briefly.

Figure 9:
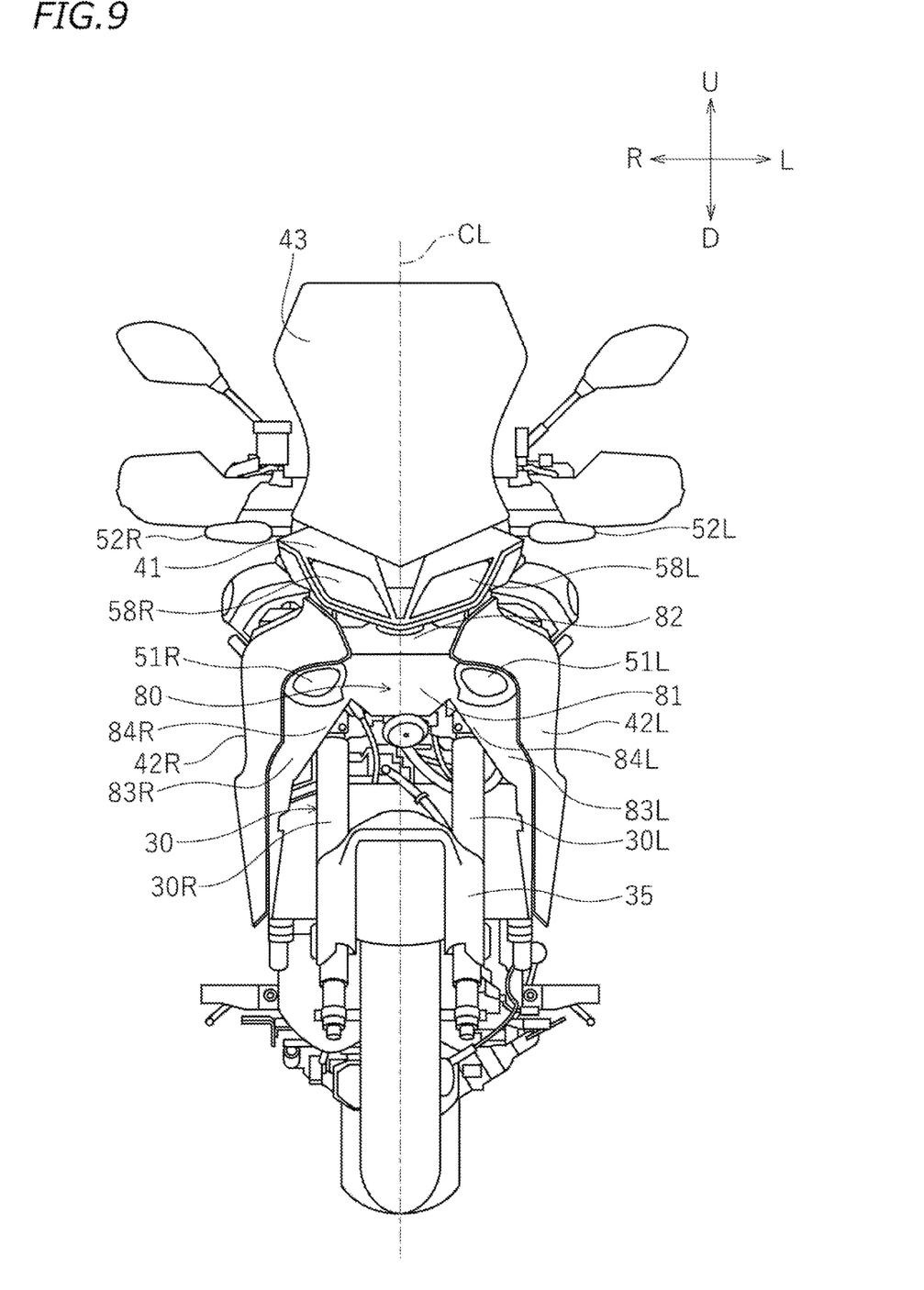
FIG. 9 is a front view showing a motorcycle according to another embodiment.

While the radar 60 is exposed forward as shown in FIG. 3 in the embodiment described above, a radar cover 80 may be provided that covers the front of the radar 60 as shown in FIG. 9. The motorcycle 1 may include the radar cover 80 that is arranged forward of the radar 60 and overlaps with the radar 60 as the vehicle is viewed from the front. The radar cover 80 may overlap with only a portion of the radar 60 or may overlap with the entirety of the radar 60 as the vehicle is viewed from the front. In the example shown in FIG. 9, as the vehicle is viewed from the front, the radar cover 80 includes a portion 81 that overlaps with the radar 60, a portion 82 that is located upward of the radar 60, a portion 83L that is located leftward relative to the vehicle center line CL and downward of the left headlight 51L, a portion 83R that is located rightward relative to the vehicle center line CL and downward of the right headlight 51R, a portion 84L that overlaps with the left tube 30L of the front fork 30, and a portion 84R that overlaps with the right tube 30R of the front fork 30. However, the radar cover 80 shown in FIG. 9 is merely an example. There is no particular limitation on the shape of the radar cover 80. The radar cover 80 is made of a material that is transparent to electromagnetic waves transmitted and received by the radar 60. For example, the radar cover 80 may be made of a polyethylene resin, a polypropylene resin, an ABS resin, or the like.

According to the embodiment shown in FIG. 9, it is possible with the radar cover 80 to prevent mud, gravel, etc., from hitting the radar 60. It is possible to prevent degradation of the radar 60. The surface of the radar cover 80 may be scratched by pebbles, etc., flying off the road. In the present embodiment, the radar cover 80 can be removed without removing the front cover 40. Therefore, it is possible to replace only the radar cover 80 without replacing the front cover 40. This makes maintenance easier.

As described above, the hole 71h in which a tool for turning the first aiming screw 71 is inserted and the hole 72h in which a tool for turning the second aiming screw 72 is inserted are open downward. The downward side of the radar cover 80 is open. Therefore, it is possible to turn the first aiming screw 71 and the second aiming screw 72 without removing the radar cover 80. It is possible to perform the operation of adjusting the orientation of the radar 60 without removing the radar cover 80.

Figure 10:
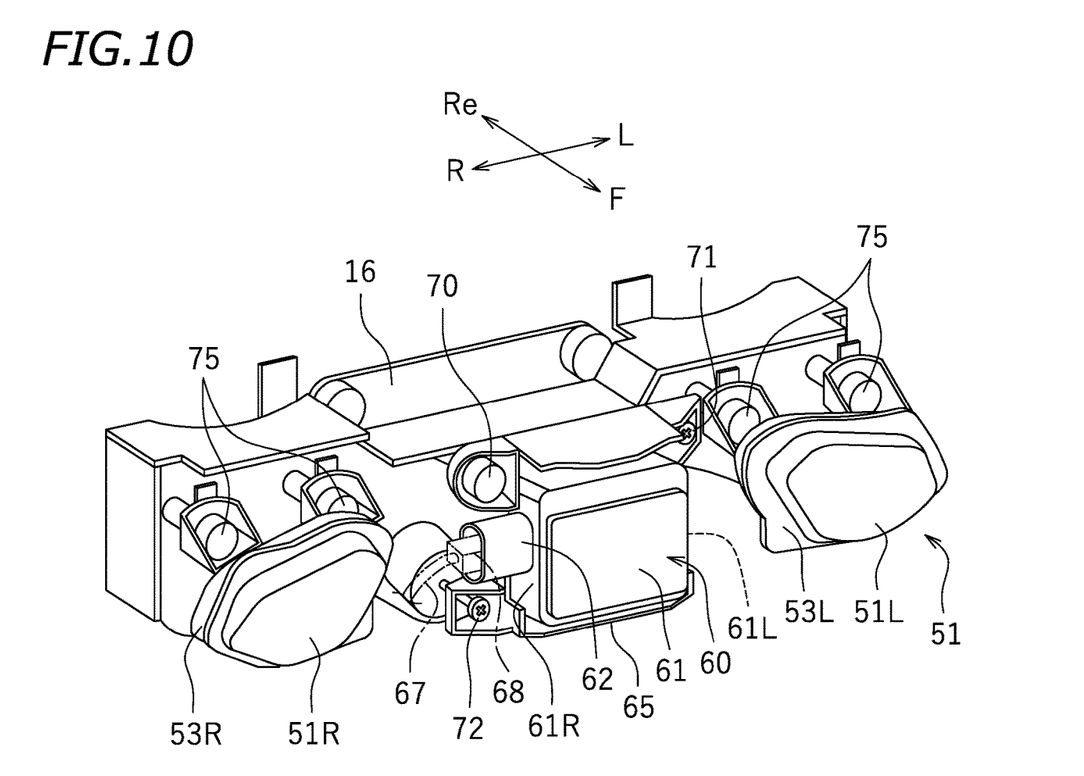
FIG. 10 is a perspective view showing a radar, a left headlight, a right headlight, a base stay, etc., of the motorcycle according to the other embodiment, as viewed from above.

In the embodiment described above, a tool such as a screwdriver for turning the first aiming screw 71 and the second aiming screw 72 is inserted in the upward direction from the downward side. A tool path is provided downward of the first aiming screw 71 and the second aiming screw 72. On the other hand, a tool may be inserted in the rearward direction from the front side as shown in FIG. 10. The first aiming screw 71 and the second aiming screw 72 may be turned by inserting a tool from the front side. A tool path may be provided forward of the first aiming screw 71 and the second aiming screw 72.

In the embodiment described above, the front end 420f of the front cover 40 is provided on the projecting portion 420 that is located lowermost among the plurality of projecting portions 410 and 420. However, the front end of the front cover may be provided on a projecting portion other than a projecting portion that is located lowermost among a plurality of projecting portions of the front cover.

There is no particular limitation on the configuration of the front cover 40. The front cowl 41, the left side cowl 42L and the right side cowl 42R may be separate from each other, or any two of, or all of, them may be an integral part. The front cover 40 may overlap with the intersection 37 as the vehicle is viewed from the side.

At least a portion of the radar 60 may be arranged upward relative to the lower end of the front cowl 41. At least a portion of the radar 60 may be arranged leftward relative to the right end of the left side cowl 42L. At least a portion of the radar 60 may be arranged rightward relative to the left end of the right side cowl 42R. At least a portion of the radar 60 may be rearward relative to the intersection 37 as the vehicle is viewed from the side.

The distance L1 between the rear end 60b of the radar 60 and the front end 10f of the vehicle body frame 10 in the front-rear direction may be equal to or longer than the distance L2 between the lower end 60d of the radar 60 and the upper end 35t of the front fender 35 in the up-down direction.

The connector 62 of the radar 60 may be provided on the upper wall or the lower wall of the casing 61. The connector 62 may be provided on other portions of the casing 61.

The radar 60 does not need to be cantilevered on the head pipe 11 with the base stay 16 therebetween.

The left headlight 51L and the right headlight 51R do not need to be supported on the base stay 16. The stay that supports the left headlight 51L and the right headlight 51R may be separate from the stay that supports the radar 60.

The motorcycle 1 does not need to include a pair of left and right headlights 51L and 51R. The headlight of the motorcycle 1 may be a single light.

The radar 60 does not need to overlap with the vehicle center line CL as the vehicle is viewed from the front. The radar 60 may be arranged leftward or rightward of the vehicle center line CL as the vehicle is viewed from the front.

One or both of the left headlight 51L and the right headlight 51R do not need to overlap with the front fork 30 as the vehicle is viewed from the front. The radar 60 may overlap with the front fork 30 as the vehicle is viewed from the front.

The aiming screw 76 for adjusting the orientation of the headlights 51L and 51R may overlap with the front cover 40 as the vehicle is viewed from the front. The first aiming screw 71 and the second aiming screw 72 for adjusting the orientation of the radar 60 may overlap with the front cover 40 as the vehicle is viewed from the front. The holes 76h, 71h and 72h may overlap with the front cover 40 as the vehicle is viewed from the front. The aiming screw for adjusting the orientation of the radar 60 may be a single aiming screw. The motorcycle 1 does not need to include an aiming screw for adjusting the orientation of the headlights 51L and 51R. The motorcycle 1 does not need to include an aiming screw for adjusting the orientation of the radar 60.

A straddled vehicle refers to a vehicle that is straddled by a passenger. A straddled vehicle is not limited to the motorcycle 1. A straddled vehicle may be an auto tricycle, an ATV (All Terrain Vehicle) or a snowmobile, for example.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

What is claimed is:

1. A straddled vehicle comprising:
   a vehicle body frame including a head pipe extending downward and forward;
   a steering shaft supported by the head pipe, the steering shaft being rotatable left and right;
   a front fork connected to the steering shaft;
   a front fender supported by the front fork;
   a front cover, at least a portion of which is arranged further forward than the head pipe;
   a radar supported by the vehicle body frame and arranged further forward than the head pipe;
   a base stay cantilevering from the head pipe; and
   a headlight supported by the base stay, wherein
   the front cover includes a front end, and a lower edge that extends leftward or rightward from the front end in a front view of the straddled vehicle, at least a portion of the lower edge being located at or below the front end;
   at least a first portion of the radar is arranged further downward than the front end of the front cover, further downward than the lower edge, and further upward than the front fender;
   the radar is supported by the base stay;
   the headlight includes a left headlight arranged further leftward than the radar, and a right headlight arranged further rightward than the radar;
   at least a second portion of the radar is arranged upward than a lower end of the left headlight and a lower end of the right headlight, and is arranged downward than an upper end of the left headlight and an upper end of the right headlight in the front view of the straddled vehicle;
   the front cover includes:
      a front cowl arranged further upward than a lower end of the head pipe,
      a left side cowl, at least a portion of the left side cowl being arranged further downward than the front cowl and further leftward than a center line of the straddled vehicle, and
      a right side cowl, at least a portion of the right side cowl being arranged further downward than the front cowl and further rightward than the center line of the straddled vehicle;
   the left side cowl includes a lower edge extending leftward in the front view of the straddled vehicle, and the right side cowl includes a lower edge extending rightward in the front view of the straddled vehicle;
   at least a portion of the left headlight is arranged downward than the lower edge of the left side cowl in the front view of the straddled vehicle; and
   at least a portion of the right headlight is arranged downward than the lower edge of the right side cowl in the front view of the straddled vehicle.

2. The straddled vehicle according to claim 1, wherein:
   the front end and the lower edge of the front cover are provided on the left side cowl or the right side cowl.

3. The straddled vehicle according to claim 2, wherein the radar is arranged further downward than the front cowl.

4. The straddled vehicle according to claim 2, wherein the radar is arranged further rightward than the left side cowl and further leftward than the right side cowl.

5. The straddled vehicle according to claim 1, wherein the radar is arranged further forward than an intersection between a front edge of the front fork and an upper edge of the front fender in a side view of the straddled vehicle.

6. The straddled vehicle according to claim 5, wherein the intersection does not overlap the front cover in the side view of the straddled vehicle.

7. The straddled vehicle according to claim 1, wherein a distance between a rear end of the radar and a front end of the vehicle body frame in a front-rear direction is shorter than a distance between a lower end of the radar and an upper end of the front fender in an up-down direction.

8. The straddled vehicle according to claim 1, further comprising:
a wire harness, and a connector connected to the wire harness, wherein
the radar includes
a casing that has a left wall and a right wall, and
a radar connector that is removably connected to the connector connected to the wire harness; and
the radar connector is provided on the left wall or the right wall of the casing.

9. The straddled vehicle according to claim 1, wherein in the front view of the straddled vehicle,
the left headlight and the right headlight overlap the front fork, and
the radar does not overlap the front fork.

10. The straddled vehicle according to claim 1, further comprising:
a headlight stay to which the headlight is fixed;
a headlight pivot that pivotally supports the headlight stay on the base stay; and
a headlight aiming screw that couples the base stay to the headlight stay, wherein
the headlight stay or the base stay has a hole formed therein, for a tool to be inserted therein to turn the headlight aiming screw;
an orientation of the headlight is adjustable by turning the headlight aiming screw; and
the hole does not overlap the front cover in the front view of the straddled vehicle.

11. The straddled vehicle according to claim 1, comprising:
a radar stay to which the radar is fixed;
a radar pivot that pivotally supports the radar stay on the base stay; and
a radar aiming screw that couples the base stay to the radar stay, wherein
the radar stay or the base stay has a hole formed therein, for a tool to be inserted therein to turn the radar aiming screw;
an orientation of the radar is adjustable by turning the radar aiming screw; and
the hole does not overlap the front cover in the front view of the straddled vehicle.

12. The straddled vehicle according to claim 11, wherein:
the radar pivot is a ball joint; and
the radar aiming screw includes
a first aiming screw arranged further leftward or rightward than the ball joint, and
a second aiming screw arranged further upward or downward than the ball joint.

13. A straddled vehicle, comprising:
a vehicle body frame including a head pipe extending downward and forward;
a steering shaft supported by the head pipe, the steering shaft being rotatable left and right;
a front fork connected to the steering shaft;
a front fender supported by the front fork;
a front cover, at least a portion of which is arranged further forward than the head pipe; and
a radar supported by the vehicle body frame and arranged further forward than the head pipe, wherein
the front cover includes a front end, and a lower edge that extends leftward or rightward from the front end in a front view of the straddled vehicle, at least a portion of the lower edge being located at or below the front end;
at least a portion of the radar is arranged further downward than the front end of the front cover, further downward than the lower edge, and further upward than the front fender;
the front cover includes a plurality of projecting portions that project forward; and
the front end of the front cover is provided on a projecting portion that is a lowermost one among the plurality of projecting portions.

14. A straddled vehicle, comprising:
a vehicle body frame including a head pipe extending downward and forward;
a steering shaft supported by the head pipe, the steering shaft being rotatable left and right;
a front fork connected to the steering shaft;
a front fender supported by the front fork;
a front cover, at least a portion of which is arranged further forward than the head pipe;
a radar supported by the vehicle body frame and arranged further forward than the head pipe; and
a radar cover that is arranged further forward than the radar and overlaps the radar in a front view of the straddled vehicle, wherein
the front cover includes a front end, and a lower edge that extends leftward or rightward from the front end in the front view of the straddled vehicle, at least a portion of the lower edge being located at or below the front end; and
at least a portion of the radar is arranged further downward than the front end of the front cover, further downward than the lower edge, and further upward than the front fender.

* * * * *